Nov. 29, 1955 E. B. RITCHEY 2,725,037
DEVICE FOR PREVENTING THE INTRODUCTION OF FERRIC SUBSTANCES
INTO THE DIGESTIVE TRACT OF AN ANIMAL
Filed July 27, 1954 2 Sheets-Sheet 1

EUGENE B. RITCHEY
INVENTOR.

BY

McMorrow, Berman + Davidson
ATTORNEYS

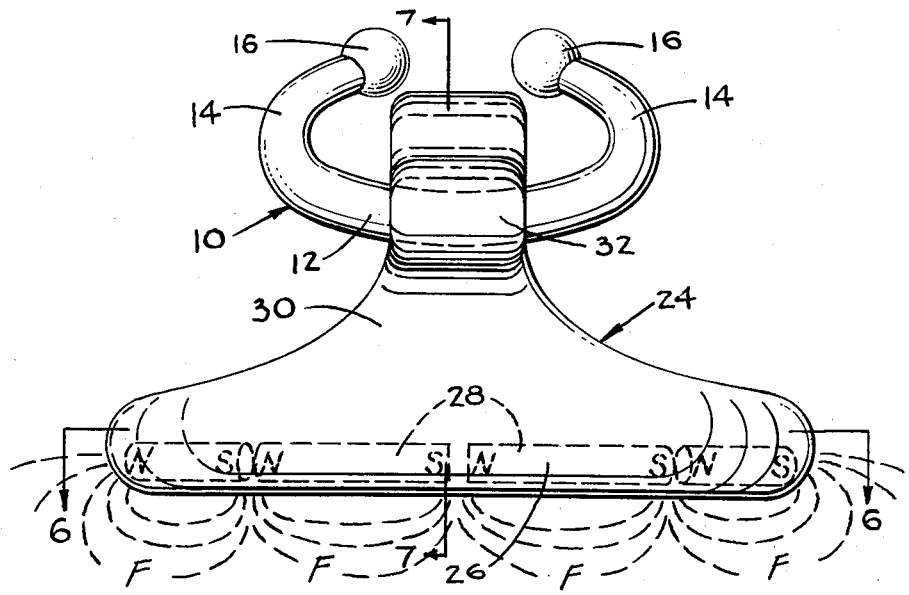
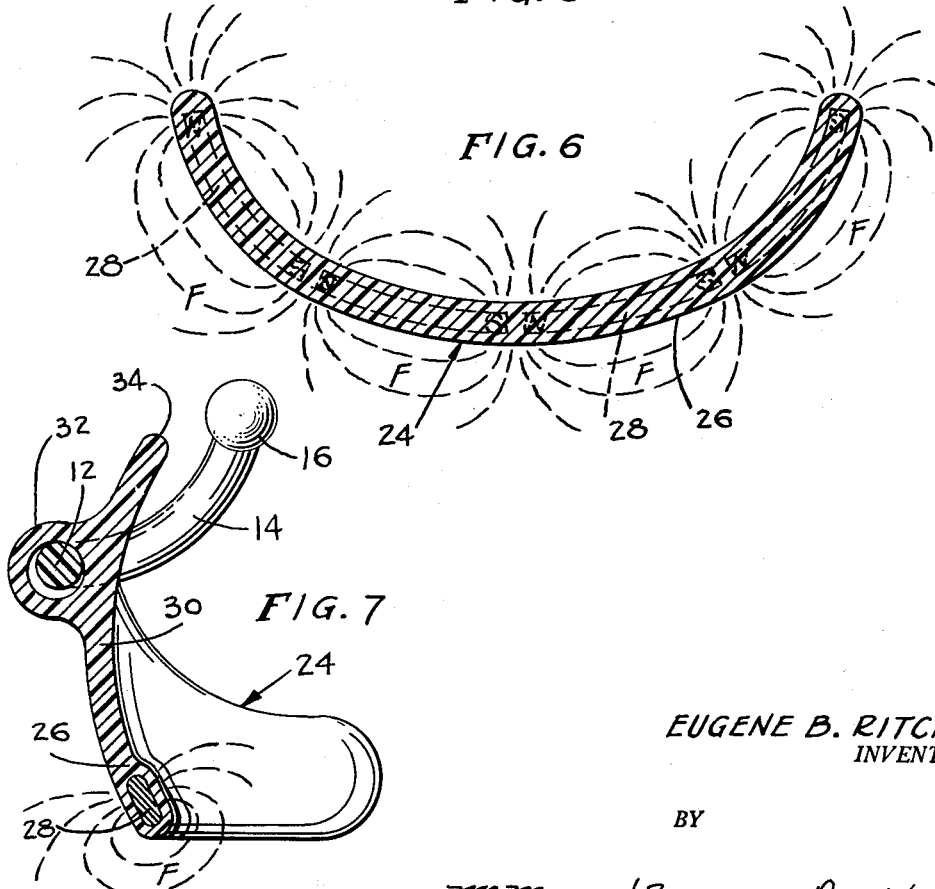

2,725,037

DEVICE FOR PREVENTING THE INTRODUCTION OF FERRIC SUBSTANCES INTO THE DIGESTIVE TRACT OF AN ANIMAL

Eugene B. Ritchey, Fort Lupton, Colo.

Application July 27, 1954, Serial No. 446,131

2 Claims. (Cl. 119—132)

This invention relates to a device for preventing the introduction of ferric substances into the digestive tract of an animal and has for its principal object to avoid diseases in animals of the type induced by the consumption of ferric substances during feeding.

Another object is to arrest the ferric substances and hold them out of the mouth of the animal so as to prevent the introduction of such substances into the digestive tract of the animal.

A further object is to support a permanent magnet on the upper lip of the animal adjacent its mouth in such a position as to cause ferric substances contained in animal feed to be attracted to the magnet and thus held out of the mouth of the animal.

Still another object is to conveniently support the apron in place.

The above and other objects may be attained by employing this invention which embodies among its features a nose clamp adapted to be supported on the nose of an animal, and a magnetically charged apron carried by the nose clamp and supported thereby adjacent the upper lip of the animal for attracting ferric substances and preventing them from entering the mouth of the animal.

Other features include a transversely curved apron adapted to rest against the upper lip of an animal, permanent magnets carried by the apron for attracting and holding ferric substances before they enter the mouth of the animal, a stem carried by the apron and extending upwardly therefrom intermediate the ends thereof for engaging the nose of the animal above its upper lip, an eye carried by the stem and extending outwardly therefrom intermediate the ends thereof, a substantially U-shaped nose clamp extending through the eye, and spherical knobs carried by the nose clamp for entering the nostrils of the animal and resiliently engaging the walls thereof for holding the device on the nose of the animal with the apron in contact with the upper lip of the animal.

In the drawings:

Figure 5 is an enlarged view of a modified form of the invention;

Figure 6 is a horizontal sectional view taken substantially on the line 6—6 of Figure 5; and Figure 7 is a vertical sectional view taken substantially on the line 7—7 of Figure 5.

Figure 2:
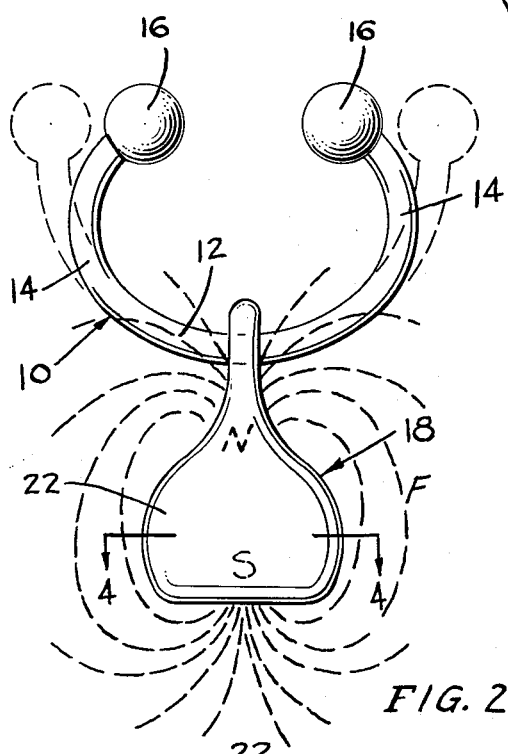
Figure 2 is an enlarged front view of the nose clamp and apron.
Figure 3:
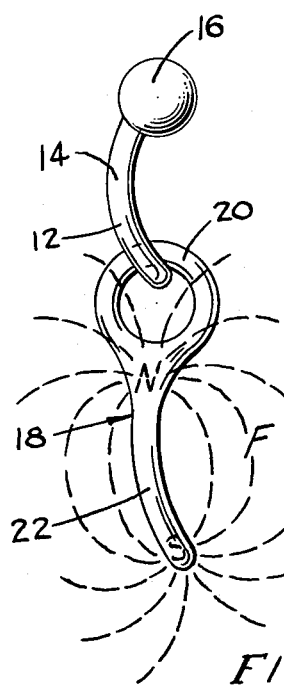
Figure 3 is a side view of Figure 2.
Figure 4:
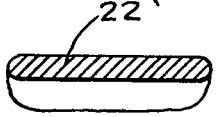
Figure 4 is a transverse sectional view taken substantially on the line 4—4 of Figure 2.

Referring to the drawings in detail, the nose N of an animal having conventional nostrils n—n is shown as having this improved device in place. The device of this invention designated generally 10 comprises a nose clamp formed of a U-formed body 12 having its bight portion disposed across the outer side of the nose N of the animal, as will be readily understood upon reference to Figure 1. The legs 14 are carried by the bight portion 12 and are flexible, as suggested by the dotted lines in Figure 2, and carried by the legs 14 and surrounding their ends remote from the bight portion 12 are spherical knobs 16 which are adapted to enter the nostrils n—n in the nose N of the animal to clampingly engage the walls thereof and hold the nose clamp 10 substantially in the position illustrated in Figure 1. It is to be noted that the legs 14 of the nose clamp 10 not only curve upwardly and inwardly from the body portion 12 but also are curved in another plane, as illustrated in Figure 3, to hold the bight portion or body 12 of the nose clamp against the nose of the animal immediately adjacent its upper lip.

In the form of the invention illustrated in Figures 1 through 4, inclusive, an apron designated generally 18 is provided with a suspension eye 20 which encircles the nose clamp 10, as will be readily undersood upon reference to the drawings, and said apron comprises a body 22 comprising a permanent magnet which creates in the immediate vicinity of the body a magnetic field F. As illustrated in the drawings, the body 22 curves towards the upper lip of the animal as it recedes from the eye 20 and is thus so disposed as to attract ferric substances carried by foodstuffs entering the mouth.

In the preferred form of the invention, illustrated in Figures 5 through 7, inclusive, the nose clamp designated generally 10 is employed in a manner similar to that previously described but instead of the apron 18, the nose clamp has substituted therefore an apron designated generally 24 which comprises a transversely curved body 26 formed of any suitable nonmagnetic material in which is imbedded longitudinally extending arcuate permanent magnets 28 which, as illustrated by the broken lines, in Figures 5 through 7, inclusive, create fields F of magnetic influence which with the apron 26 disposed adjacent the mouth of the animal will attract and hold ferric substances contained in the food being consumed by the animal.

Carried by and extending upwardly from the transversely curved body 26 intermediate the ends thereof is a stem 30 which, as illustrated in Figure 7, is curved longitudinally and carries intermediate its ends an eye 32 through which the bight portion or body 12 of the nose clamp 10 is extended. The end of the stem 30 remote from the apron 24 defines a pad 34 which engages the nose of the animal N above the nostrils n—n to hold the transversely curved body 26 of the apron 24 against the upper lip of the animal in such a position as to cause food entering the mouth of the animal to pass through the magnetic fields F of the magnets 28.

Figure 1:
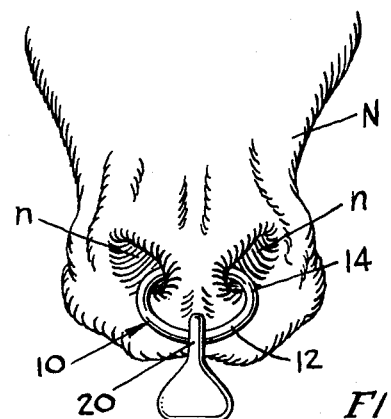
Figure 1 is a view of one form of this invention showing it supported in the nostrils of the nose of an animal and the apron supported on the nose clamp.

In use, it will be evident that upon inserting the nose clamp 10 into the nostrils n—n of the nose N of an animal, as illustrated in Figure 1, the apron 18, or the apron 24, will be suspended adjacent the upper lip of the animal so that food entering the mouth of the animal will have to pass through the field F of influence of the magnetically charged apron so that any ferric substances contained within the food will be attracted by the magnet or magnets and held by the apron out of the mouth of the animal so as to avoid the introduction of the ferric substances into the digestive tract of the animal. In this way, injury to the digestive tract or illness caused by the introduction of ferric substances thereinto will be avoided and the device may be readily attached to the animal or detached therefrom at the desire of the user.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A device for preventing the introduction of ferric substances into the digestive tract of an animal which comprises a resilient U-shaped body having spherical knobs at opposite ends thereof and defining a nose clamp adapted to enter opposite nostrils of the animal, an apron carried by the nose clamp and depending therefrom adjacent the upper lip of the animal, and permanent magnets carried by the apron adjacent the end thereof remote from the nose clamp for creating a field of magnetic influence adjacent the mouth of the animal.

2. A device for preventing the introduction of ferric substances into the digestive tract of an animal which comprises a transversely curved apron adapted to rest against the upper lip of an animal, permanent magnets carried by the apron for attracting and holding ferric substances before they enter the mouth of the animal, a stem carried by the apron and extending upwardly therefrom intermediate the ends thereof for engaging the nose of the animal above its upper lip, an eye carried by the stem and extending outwardly therefrom intermediate the ends thereof, a substantially U-shaped nose clamp extending through the eye, and spherical knobs carried by the nose clamp for entering the nostrils of the animal and resiliently engaging the walls thereof for holding the device on the nose of the animal with the apron in contact with the upper lip of the animal.

References Cited in the file of this patent
UNITED STATES PATENTS

| | | |
|---|---|---|
| 233,891 | Stoddard | Nov. 2, 1880 |
| 967,468 | Wagner, Jr. | Aug. 16, 1910 |
| 2,056,906 | Parkhill | Oct. 6, 1936 |